United States Patent
Frances et al.

(10) Patent No.: US 6,867,242 B1
(45) Date of Patent: Mar. 15, 2005

(54) METHOD FOR PRODUCING A SEALED RELEASE COATING APPLIED ON A CYLINDER-HEAD GASKET USING A SILICONE MATERIAL

(75) Inventors: Jean-Marc Frances, Meyzieu (FR); Olivier Loubet, Lyons (FR)

(73) Assignee: Rhodia Chimie, Courbevoie (FR)

( * ) Notice: Subject to any disclaimer, the term of this patent is extended or adjusted under 35 U.S.C. 154(b) by 29 days.

(21) Appl. No.: 10/009,605

(22) PCT Filed: Jun. 8, 2000

(86) PCT No.: PCT/FR00/01571

§ 371 (c)(1),
(2), (4) Date: Mar. 20, 2002

(87) PCT Pub. No.: WO00/77083

PCT Pub. Date: Dec. 21, 2000

(30) Foreign Application Priority Data

Jun. 11, 1999 (FR) .............................. 99 07648

(51) Int. Cl.$^7$ ............................. C08K 5/00; C08K 5/55; C09K 3/10
(52) U.S. Cl. .............................. 522/31; 522/53; 522/55; 522/66; 522/99; 522/148; 528/13; 528/14; 528/15; 528/17; 528/18; 528/19; 528/25; 528/26; 528/27; 427/503; 427/505; 427/515; 427/516
(58) Field of Search .............................. 522/99, 148, 31, 522/66, 53, 55; 528/12–23, 25, 26, 27, 33; 427/505, 503, 515, 516

(56) References Cited

U.S. PATENT DOCUMENTS

| | | | | |
|---|---|---|---|---|
| 4,220,342 A | * | 9/1980 | Shah | ........................... 277/654 |
| 4,483,539 A | * | 11/1984 | Bindel et al. | ................ 264/137 |
| 5,340,898 A | * | 8/1994 | Cavezzan et al. | .............. 528/19 |
| 5,665,850 A | * | 9/1997 | Priou | ........................... 528/31 |
| 5,693,688 A | * | 12/1997 | Priou | ........................... 522/25 |
| 6,417,243 B1 | * | 7/2002 | Peeters et al. | ................ 522/31 |
| 6,423,378 B1 | * | 7/2002 | Cotting et al. | .............. 427/387 |

FOREIGN PATENT DOCUMENTS

| | | |
|---|---|---|
| EP | 0 522 703 | 1/1993 |
| EP | 0 539 234 | 4/1993 |
| FR | 2 757 530 | 6/1998 |
| FR | 2 757 870 | 7/1998 |
| WO | WO 97/35924 | 10/1997 |

* cited by examiner

Primary Examiner—Susan Berman
(74) Attorney, Agent, or Firm—Burns, Doane, Swecker & Mathis, L.L.P.

(57) ABSTRACT

The invention relates to a method for producing a sealed impregnation and/or release coating of flat joints, in particular of cylinder-head gaskets such as composite seals, metallic joints and multi-layered steel joints. The invention uses a silicone composition including at least a polyorganosiloxane A crosslinkable by a cationic and/or radical process by appropriate crosslinking functional groups, for example, of the alkenyl ether, acrylic, acrylate, epoxide and/or oxethane type; at least an initiator salt B selected among onium borates or an organometallic complex; and at least a reactive diluent C including a nonorganosilicon or organosilicon compound comprising in its structure at least a crosslinking functional group and optionally a secondary functional group different from the crosslinking functional group but capable of chemically reacting with a crosslinking functional group, for example of the hydroxyl, alkoxy and/or carboxyl type. In the method, the silicone composition can further include different additives such as a pigment D and/or a mineral filler E and/or a photosensitizer F and/or a stabilizing amino compound G and/or an adherence promoter H.

11 Claims, No Drawings

METHOD FOR PRODUCING A SEALED RELEASE COATING APPLIED ON A CYLINDER-HEAD GASKET USING A SILICONE MATERIAL

The general field of the present invention is that of the use of crosslinkable silicone compositions for the purpose of preparing crosslinked materials, for example elastomers, of use in particular in pointing, leakproofing and releasing.

More specifically, the invention relates to the use of crosslinkable silicone compositions for the treatment of sheet gaskets, in particular for impregnating or varnishing (coating) cylinder head gaskets of internal combustion engines. In other words, it relates, using these crosslinkable silicone compositions, to impregnating sheet gaskets (cylinder head gaskets) and/or to preparing release coatings at the "engine block/cylinder head" interface of heat engines, said interface preferably being the cylinder head gasket itself.

The main unit of an internal combustion engine comprises various subunits which have to be taken off to allow access to the interior of the engine. One of these subunits is the cylinder head. The contact surfaces between the cylinder head and the engine block (or cylinder block) are not strictly parallel and the finishing of their surface condition may not be perfect. To remove this unevenness, it is necessary to place a relatively flexible gasket between the cylinder head and the engine block to absorb the abovementioned surface imperfections and to provide leaktightness with respect to the intersecting circulations of cooling fluid (water+glycol+alkaline agent), oil and gases in the course of combustion. The cylinder head gasket also has the role of providing for the cohesion of the "engine block/cylinder head" dismountable assembly. To take on these roles, the cylinder head gasket should therefore be capable of expressing at least two basic functions, namely: leaktightness and releasability.

In the case where the constituent material of the cylinder head gasket is porous in nature (composite gasket), it is necessary to at least partially remove this porosity by impregnation. This makes it possible, first, to improve the leaktightness of the material with respect to fluids present in the engine and, secondly, to confer on it a degree of flexibility useful in absorbing the compression of the gasket when the cylinder head is tightened onto the engine block.

Furthermore, on taking off the cylinder head, the gasket should be able to be taken off easily without adhering to the surfaces of the two joining planes. This releasability function is provided by varnishing products, which are applied in the form of a coating.

The three most common types of cylinder head gaskets are composite gaskets, metal gaskets and multilayer metal gaskets.

Composite gaskets, also known as fiber (or soft) gaskets, are used for specific vehicles, small household appliances and mopeds. The composite gasket is composed of a metal plate or core inserted between two composite plates based on organic fiber (aramide) and on inorganic filler (graphite). The composite gasket also comprises crimpings, firing rings, often over the explosion chamber, and a kerb made of silicone elastomer for confining possible leaks onto the surface.

These composite gaskets are conventionally subjected to impregnation treatments by dipping in polycondensation heat silicone resins (hydroxylated resins catalyzed with lead octoate) or polyaddition heat silicone resins (SiH/Si-vinyl resins catalyzed with platinum). The varnishing of the gasket using (poly-addition and polycondensation) silicone resins follows the impregnation. Finally, the kerb made of silicone elastomer is deposited by silk-screen printing.

Metal gaskets are used for some upmarket vehicles and for heavy civil engineering vehicles. There also exist metal-silicone elastomer inserts of the hot curable elastomer HCE type.

Multilayer metal gaskets, more commonly known as MLS (multilayer steel) gaskets, are used for specific and industrial vehicles. The multilayer metal gasket is composed of metal layers each covered on both faces with an elastomer coating. These MLS multilayer metal gaskets are enjoying strong growth. In contrast to composite gaskets, it should be noted that they are subjected only to the stage of treatment by varnishing with the elastomer.

MLSs make it possible to reduce the distortion and to improve the torsional moment and thus the efficiency of the engines. This thus results in a lower consumption, a reduction in emission of pollutants and a lower cost. With regard to manufacture, MLSs make possible better control of the dimensions and of the thickness of the gaskets, which facilitates adjustment during assembly. By virtue of their ability to withstand explosions and corrosion, these MLS gaskets give a better performance than composite fiber gaskets.

The impregnating agents and varnishes conventionally used for composite gaskets are compositions composed of silicone oils or resins of low viscosity comprising SiOH or SiH functional groups (U.S. Pat. No. 4,720,316; EP-A-272 382) or SiVinyl functional groups (DE-A-3 731 032; U.S. Pat. No. 4,499,135) or of mixtures of a silicone oil or resin comprising SiH functional groups and of a silicone oil or resin comprising SiVinyl functional groups (DE-A-3 718 559; EP-A-471 979; DE-A-3 544 740) capable of crosslinking at high temperature (generally greater than 100° C.) in the presence of a metal catalyst, such as tin, titanium, zirconium or platinum salts, or of a peroxide.

Compositions based on silicone oils or resins comprising SiOH, SiH, SiVinyl or SiH/SiVinyl functional groups generally exhibit at least one of the following disadvantages:

the mixture composed of the silicone matrix and the catalyst is unstable at ambient temperature (in particular in the absence of solvent), this instability being reflected by an increase in viscosity, indeed even by a gelling, of the impregnation or varnishing bath, which requires frequent replacement of the impregnation or varnishing bath or treatment in two stages; for example, patents U.S. Pat. No. 4,720,316 and EP-A-272 382 recommend the use of the catalyst during the manufacture of the board and then impregnation of the dried board with a silicone oil possessing SiH groups;

it is often necessary to disperse the silicone+catalyst mixture in an organic solvent in order to increase the stability and to decrease the viscosity of said mixture; this results in the disadvantages related to the use of solvents (toxicity, provision of safety devices and of devices for recycling the solvent);

the cost price of the starting materials is high, in particular in the case of vinylated oils or resins optionally used in combination with oils or resins possessing SiH functional groups and with a platinum catalyst; these mixtures can be very stable at ambient temperature, in particular in the presence of a platinum inhibitor, but are expensive because of the use of vinylated oils or resins.

In the quest for a novel silicone composition for the treatment of cylinder head gaskets having the object of improving the abovementioned known compositions, provision has been made to use a silicone composition crosslinkable by hydrosilylation comprising an α,ω-diOH POS, a POS possessing an SiH unit of the polymethylhydrosiloxane type, and ethynylcyclohexanol, the latter compound making it possible to form resins possessing a silanol functional group; the ratio of SiH to SiOH of the POS concerned being of the order of 10/1 to 30/1 and the composition also comprising a polyaddition catalyst of the Karstedt type (cf. French patent application FR-A-2 697 532).

Even if such a composition effectively leads to improvements with regard to stability, reactivity and flexibility of use, it still remains the case that the crosslinking specific to this type of composition comprises a restrictive stage of heating at high temperature (160° C.) for 5 to 10 minutes. Such a stage is particularly penalizing with regard to the productivity of an industrial process for the treatment or coating of cylinder head gaskets using silicones. It may thus be necessary, for example, to resort to the use of sophisticated and expensive equipment, such as long heating tunnels. It therefore seems that these silicone compositions, crosslinkable by polyaddition and used for the coating of cylinder head gaskets, still do not contribute an entirely satisfactory solution to the problem of carrying out silicone impregnation and treatment of cylinder head gaskets which meet the specifications of releasability and of compressibility, as well as the requirements of productivity and of profitability for large scale production.

French patent application No. 2 722 203 relates to the application of a crosslinkable fluorosilicone coating to a cylinder head gasket. Such a coating is obtained from a silicone composition crosslinkable, under the effect of heat, of UV radiation or of an electron beam, by hydrosilylation. This composition comprises a vinylated fluorosilicone, a POS carrying SiH units, a platinum hydrosilylation catalyst, a condensation catalyst of the peroxide type and, optionally, a solvent of the halogenated solvent, ester or ketone type. The support to which this composition can be applied is described as preferably having a silicone nature. This coating is more specifically intended to reduce the impermeability with respect to oil of cylinder head gaskets. It is a relatively thick coating: 0.1–10 mm, which is characterized by a relatively long crosslinking time (several minutes) and which has to be activated by heat for the crosslinking, even in the cases where UV radiation is used. This known coating is therefore not itself satisfactory either as regards the requirements related to large scale industrial production. Furthermore, the fact that the crosslinking of this fluorosilicone composition is based on an SiH/SiVi hydrosilylation mechanism poses problems of stability.

U.S. Pat. No. 5,260,348 also discloses a silicone composition crosslinkable under UV radiation according to a condensation mechanism. Such a composition is of use in the preparation of a release coating, in particular for cylinder head gaskets. This composition comprises an α,ω-diOH POS of the polydimethylsiloxane or polydifluoroalkylsiloxane type, a crosslinking agent of the methyl- or ethyltriacetoxysilane or methyltri-benzoxysilane type, and a photoinitiator formed by an onium (iodonium) salt, the counteranion of which is $BF_4^-$ or $SbF_6^-$. These silicone compositions crosslinkable under UV radiation by condensation have to be subjected to an additional thermal activation in order to obtain reasonable crosslinking times. It is obvious that this complicates the industrial process. The counteranion with the best performance for crosslinking under UV radiation is $SbF_6^-$ but it is found that it exhibits the major disadvantage of comprising a heavy metal, which can lead to a problem of toxicity with respect to the environment.

With regard to the varnishing of metal cylinder head gaskets and in particular MLS multilayer gaskets, NBR rubber elastomer coatings or fluorinated elastomer coatings of the Viton® type are known in practice.

NBR is an elastomer formed by an acrylonitrile-butadiene copolymer, the main disadvantage of which in cylinder head gasket applications is its low thermal stability.

Viton® is a random copolymer of vinylidene fluoride, of hexafluoropropene and of tetrafluoro-ethylene. Coating compositions for cylinder head gaskets based on Viton® also comprise talc or magnesium silicate, carbon black, an unbonded silicone oil and fatty acid esters (plasticizers) and a crosslinking agent of bisphenol or diamine type. It should be noted that Japanese patent application JP-A-08/209,113 relates to such varnishes based on Viton® for metal multilayer cylinder head gaskets. The preparation of Viton® elastomer coatings or varnishes involves a thermal crosslinking of 2.5 to 15 minutes at a temperature of 200 to 250° C., followed by a postcuring for several hours at high temperature.

In addition, the application of the uncrosslinked Viton® composition is carried out by spraying an organic solution with a spray gun. In point of fact, it is known that recourse to organic solvents presents problems of safety and of toxicity. Furthermore, this process is restrictive in that it does not make it possible to prepare elastomer films with a thickness of greater than 12 μm. The adhesion of this elastomer coating based on Viton® to the metal can be improved. Finally, and in particular, the "material and process" cost for these coatings based on Viton® remains relatively high.

Patent application PCT/WO-A-98/29498 relates both to metal cylinder head gaskets and composite cylinder head gaskets. The invention which is the subject matter of this PCT application is the impregnation and/or coating of cylinder head gaskets by employing a silicone composition crosslinkable by the cationic route under activation and in the presence of specific photoinitiators selected from onium borates or borates of organometallic complexes, the borate counteranions of which comprise at least one boron bonded to at least one substituted (Me, F) phenyl. The liquid silicone precursor is a polydimethylsiloxane substituted by functional groups for bridging by the cationic route, for example of epoxy or vinyloxy type. It turned out that this invention can be improved with regard to some of the specifications forming the requirements for cylinder head gasket coatings or varnishes and in particular MLS multilayer metal cylinder head gaskets. These specifications are indicated below:

releasability of the engine block and of the cylinder head on the gasket coated with the crosslinked elastomer film, adhesion of this coating to the support, in particular metal support, constituting the gasket, leaktightness, mechanical properties (hardness, resistance to scratching), resistance to solvents, resistance to engine fluids (oils and cooling fluids), resistance to temperature.

It is therefore necessary to observe that, in the current state of the art, there does not exist a leaktight and release elastomer coating which is entirely well suited to cylinder head gaskets and more particularly to metal cylinder head gaskets and more specifically still to MLS multilayer metal cylinder head gaskets. This comment is equally valid for the uncrosslinked liquid precursors of these elastomer coatings.

In such a context, one of the essential objects of the present invention is thus to provide a crosslinkable silicone composition suited to the impregnation and/or coating of sheet gaskets, in particular cylinder head gaskets (more especially MLS metal gaskets), which overcome the deficiencies of the prior art while being better than the latter in meeting the abovementioned requirements and which gives access to a process for carrying out impregnation and/or coating which is fast, which does not require sophisticated equipment, the use of toxic and dangerous solvents or high temperatures, and which makes it possible to obtain a silicone coating or a varnish which is sufficiently adherent to the support of the gasket, gives sufficient release with respect to the cylinder head and the engine block, is leaktight, is ard, is resistant to scratching, to solvents and to engine fluids, and, furthermore, is stable to temperature.

Another essential object of the invention is to find a process for impregnating and/or coating a sheet gasket, in particular a cylinder head gasket, preferably an MLS cylinder head gasket, which is economical and simple to employ and which makes it possible to obtain a release silicone cylinder head gasket which performs-well in the surroundings in which it is used.

Another essential object of the invention is to provide a sheet gasket, in particular a cylinder head gasket, preferably an MLS cylinder head gasket, impregnated and/or coated with a release and compressible crosslinked silicone exhibiting all the expected specifications mentioned above.

Once these objects have been set, it is to the credit of the Applicant Company to have found, after many studies and experiments, that, entirely surprisingly and unexpectedly, it is appropriate to employ, in the process for carrying out impregnation and/or preparing a coating, a polyorganosiloxane A, an initiator B of onium borate or organometallic complex borate type, and a reactive diluent C comprising the same crosslinking functional groups as the POS A. This ABC combination is essential for the preparation, in particular, of excellent silicone varnishes for MLS cylinder head gaskets.

It results from this that the present invention relates to a process for carrying out impregnation and/or for preparing a coating which gives release and is leaktight employed at the engine block/cylinder head interface of engines and applied in particular to sheet gaskets, in particular cylinder head gaskets,
characterized in that it consists essentially:
1—in employing a silicone composition comprising:
A—100 parts by weight of at least one polyorganosiloxane (POS) crosslinkable by the cationic and/or radical route and via crosslinking functional groups (CFGs), these CFGs being identical to or different from one another and being chosen from those comprising at least one functional unit of heterocyclic nature having one or more electron-donating atoms, preferably O, S, N or P, and/or from those which are ethylenically unsaturated and substituted by at least one electron-donating atom which enhances the basicity of the π system;
B—from 0.01 to 10, preferably 0.1 to 5, parts by weight of at least one initiator salt (PI) formed by a borate of an onium of an element from groups 15 to 17 of the Periodic Classification [Chem. & Eng. News, Vol. 63, No. 5, 26 of February 4, 1985] or of an organometallic complex of an element from groups 4 to 10 of the Periodic Classification (same reference),
the cationic entity of said borate being chosen from:

(1)—onium salts of formula (I):

$$[(R^1)_n\text{—}A\text{—}(R^2)_m]^+ \quad (I)$$

in which formula:
A represents an element from groups 15 to 17, such as, for example, I, S, Se, P or N;
$R^1$ represents a $C_6$–$C_{20}$ carbocyclic or heterocyclic aryl radical, it being possible for said heterocyclic radical to comprise nitrogen or sulfur as heteroelements;
$R^2$ represents $R^1$ or a linear or branched $C_1$–$C_{30}$ alkyl or alkenyl radical; said $R^1$ and $R^2$ radicals optionally being substituted by a $C_1$–$C_{25}$ alkoxy, $C_1$–$C_{25}$ alkyl, nitro, chloro, bromo, cyano, carboxy, ester or mercapto group,
n is an integer ranging from 1 to v+1, v being the valency of the element A,
m is an integer ranging from 0 to v−1, with n+m=v+1,
(2)—the oxoisothiochromanium salts having the formula:

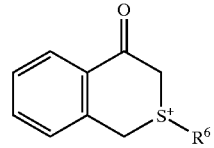

(II)

where the $R^6$ radical represents a linear or branched $C_1$–$C_{20}$ alkyl radical;
(3)—sulfonium salts where the cationic entity comprises;
3.1. at least one polysulfonium species of formula III.1

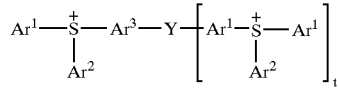

(III.1)

in which:
the $Ar^1$ symbols, which can be identical to or different from one another, each represent a monovalent phenyl or naphthyl radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group, a —COO-alkyl ester group, where the alkyl part is a linear or branched $C_1$–$C_{12}$, preferably $C_1$–$C_6$, residue, and a group of formula $Y^4$—$Ar^2$, where the $Y^4$ and $Ar^2$ symbols have the meanings given immediately below,
the $Ar^2$ symbols, which can be identical to or different from one another or $Ar^1$, each represent a monovalent phenyl or naphthyl radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group or a —COO-alkyl ester group, where the alkyl part is a linear or branched $C_1$–$C_{12}$, preferably $C_1$–$C_6$, residue,
the $Ar^3$ symbols, which can be identical to or different from one another, each represent a divalent phenylene or naphthylene radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group or a —COO-alkyl ester group, where the alkyl part is a linear or branched $C_1$–$C_{12}$, preferably $C_1$–$C_6$, residue, t is an integer equal to 0 or 1, with the additional conditions according to which:

when t=0, the Y symbol is then a $Y^1$ monovalent radical representing the group of formula:

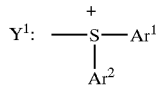

where the $Ar^1$ and $Ar^2$ symbols have the meanings given above, when t=1:

on the one hand, the Y symbol is then a divalent radical having the following meanings $Y^2$ to $Y^4$:

$Y^2$: a group of formula:

where the $Ar^2$ symbol has the meanings given above, $Y^3$: a single valency bond, $Y^4$: a divalent residue chosen from:

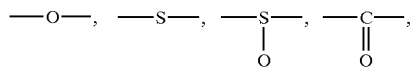

a linear or branched $C_1$–$C_{12}$, preferably $C_1$–$C_6$, alkylene residue and a residue of formula —Si$(CH_3)_2$O—, on the other hand, solely in the case where the Y symbol represents $Y^3$ or $Y^4$, the $Ar^1$ and $Ar^2$ (terminal) radicals have, in addition to the meanings given above, the possibility of being connected to one another via the Y' residue consisting in $Y'^1$, a single valency bond, or in $Y'^2$, a divalent residue chosen from the residues cited with respect to the definition of $Y^4$, which is inserted between the carbon atoms, facing each other, situated on each aromatic ring in the ortho position with respect to the carbon atom directly bonded to the $S^+$ cation;

3.2. and/or at least one monosulfonium species having a single $S^+$ cationic center per mole of cation and consisting, in the majority of cases, in species of formula:

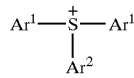

(III.2)

in which $Ar^1$ and $Ar^2$ have the meanings given above with respect to the formula (III.1), including the possibility of connecting directly between them only one of the $Ar^1$ Radicals to $Ar^2$ According to the Way indicated above with respect to the definition of the additional condition in force when t=1 in the formula (II) involving the Y' residue;

(4) organometallic salts of formula (IV):

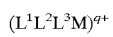 (IV)

in which formula:

M represents a metal from group 4 to 10, in particular chosen from iron, manganese, chromium or cobalt, $L^1$ represents 1 ligand bonded to the metal M via π electrons, which ligand is chosen from $\eta^3$-alkyl, $\eta^5$-cyclopendadienyl and $\eta^7$-cyclo-heptratrienyl ligands and $\eta^6$-aromatic compounds chosen from optionally substituted $\eta^6$-benzene ligands and compounds having from 2 to 4 condensed rings, each ring being capable of contributing to the valency layer of the metal M via 3 to 8 πelectrons, $L^2$ represents a ligand bonded to the metal M via π electrons, which ligand is chosen from $\eta^7$-cycloheptatrienyl ligands and $\eta^5$-aromatic compounds chosen from optionally substituted $\eta^6$-benzene ligands and compounds having from 2 to 4 condensed rings, each ring being capable of contributing to the valency layer of the metal M via 6 or 7 π electrons, $L^3$ represents from 0 to 3 identical or different ligands bonded to the metal M via σ electrons, which ligand(s) is (are) chosen from CO and $NO_2^+$; the total electronic charge q of the complex to which $L^1$, $L^2$ and $L^3$ and the ionic charge of the metal M contribute being positive and equal to 1 or 2;

the anionic entity [lacuna] borate having the formula:

$[BX_aR_b]^-$ in which formula:

a and b are integers ranging from 0 to 3 for a and from 1 to 4 for b, with a+b=4, the X symbols represent:

a halogen atom (preferably chlorine or fluorine) with a 0 to 3, an OH functional group with a=0 to 2, the R symbols are identical or different and represent:

a phenyl radical substituted by at least one electron-withdrawing group, such as, for example, $OCF_3$, $CF_3$, $NO_2$ or CN, and/or by at least 2 halogen atoms (very particularly fluorine), this being when the cationic entity is an onium of an element from groups 15 to 17, a phenyl radical substituted by at least one electron-withdrawing element or group, in particular a halogen atom (very particularly fluorine), $CF_3$, $OCF_3$, $NO_2$ or CN, this being when the cationic entity is an organometallic complex of an element from groups 4 to 10, an aryl radical comprising at least two aromatic nuclei, such as, for example, biphenyl or naphthyl, which is optionally substituted by at least one electron-withdrawing element or group, in particular a halogen atom (very particularly fluorine), $OCF_3$, $CF_3$, $NO_2$ or CN, whatever the cationic entity;

C—1 to 50, preferably 1 to 35, parts by weight of at least one reactive diluent consisting in a nonorganosilicon or organosilicon organic compound comprising, in its structure, at least one CFG as defined above and optionally at least one secondary functional group (SFG) other than a CFG but capable of reacting chemically with a CFG;

D—0 to 10, preferably 0.1 to 5, parts by weight of at least one pigment, preferably a black pigment and more preferably still carbon black;

E—0 to 100, preferably 0 to 50, parts by weight of a filler of inorganic nature;

F—0 to 10, preferably 0.01 to 1, part by weight of at least one photosensitizer preferably selected from (poly)aromatic compounds (optionally metallic) and/or heterocyclic compounds;

G—0 to $10^{-2}$, preferably $10^{-5}$ to $10^{-2}$, part by weight of a stabilizer consisting in at least one stabilizing amine agent, H—0 to 5, preferably 0 to 2, parts by weight of an adhesion promoter preferably chosen from alkoxylated and/or epoxidized silanes;

2—in applying this composition to a support (cylinder head sheet gasket or cylinder head/engine block interface), and 3—in crosslinking the applied composition by photochemical and/or thermal activation and/or under an electron beam.

This invention is an improvement to that according to application WO-A-98/29 498, in which use is made of a silicone composition crosslinkable by the cationic route comprising a polyorganosiloxane POS A and an initiator B but devoid of the diluent C carrying CFG and optionally SFG functional group(s).

This ABC combination is the source of advantageous and unexpected results for the impregnation and/or varnishing of sheet gaskets, in particular cylinder head gaskets, in terms of releasability, of adhesion to the support (preferably metal support) of the gasket of leaktightness, of mechanical properties, of resistance to solvents and to engine fluids, and of resistance to temperature.

In this ABC combination, the initiator B is conspicuous by its onium borate or organometallic salt borate nature with a borate counteranion of the boro-phenyl type substituted by electron-withdrawing groups, for example fluorinated groups. Among others, the uncrosslinked liquid composition used in the process according to the invention possesses excellent stability on storage. Its viscosity remains low despite the presence of the initiator. This stability is observed for several days, indeed even several months, after preparing the composition, provided that it is stored with light excluded. This precursor liquid composition also has very good reactivity at ambient temperature.

The uncrosslinked liquid silicone composition ABC, optionally comprising D and/or E and/or F and/or G and/or H, is easy to handle. Its viscosity can be adjusted within a wide range by modifying the molar mass of the CFG-carrying POS A oil and/or of the CFG- and optionally SFG-carrying diluent C, the concentration of initiator B, and the CFG/POS A and (CFG+optionally SFG)/diluent C molar ratio. Furthermore, it should be noted that the uncrosslinked liquid silicone composition does not necessarily comprise a toxic and dangerous organic solvent.

The process according to the invention is economical, simple and fast and therefore ultimately productive and profitable. It makes it possible in particular to obtain varnishes on sheet gaskets, in particular cylinder head gaskets and especially on metal cylinder head gaskets of MLS multilayer type, which have a beautiful appearance (absence of bubbles and which meet the required qualities of releasability, of leaktightness and of compressibility. In addition, this crosslinked varnish has good mechanical properties, resistance to abrasion, thermal stability and resistance to oils and more generally to aggressive materials, such as cooling fluids, which are entirely satisfactory.

According to a preferred embodiment of the process according to the invention, the support is a metal cylinder head gasket, preferably a multilayer metal cylinder head gasket of MLS type.

It is advantageous in the context of this preferred embodiment for provision to be made, according to the process, to form a coating on at least one of the faces of at least one of the layers composing the multilayer metal cylinder head gasket, this coating preferably being applied to both external faces of the multilayer gasket.

In practice, it is preferable for each of the layers of the gasket to be coated on both its faces with a silicone coating, from an ABC composition optionally comprising D and/or E and/or F and/or G and/or H, crosslinked by photochemical and/or thermal activation and/or under an electron beam.

On entering into detail regarding the nature of the various constituents of the silicone treatment composition employed in the process according to the invention, it will be specified, regarding the POSs A, that the functional units included in the CFG groups carried by the silicon atoms are selected from the group of following functional units:

an ethylenically unsaturated and activated functional group, such as (meth)acrylic, (meth)acrylate and alkenyl ether, epoxide, oxethane, their mixtures.

As regards the diluent C, the CFG groups are carried by carbon or silicon atoms and they comprise functional units which are selected from the group of units mentioned in the preceding paragraph. It should be noted that the CFGs of diluent C can be identical to or different from the CFGs of the POS(s) A. As regards the diluent C and the optional CFG groups, they are here again carried by carbon or silicon atoms of the diluent C and they comprise functional units which are selected from the group of the following units:

hydroxyl, alkoxy, carboxyl, their mixtures.

More preferably still, the POSs A are epoxy-silicones and/or vinyl ether silicones which are:

→ either linear or substantially linear and composed of units of formula (I), terminated by units of formula (II), → or cyclic and composed of units of formula (II):

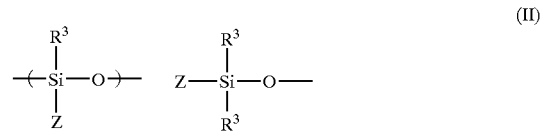

(II)

in which formulae:

the $R^3$ symbols are alike or different and represent:

either a hydroxyl radical, or a linear or branched $C_1$–$C_{18}$ alkyl radical which is optionally substituted, advantageously by one or more halogens and/or a hydroxyl radical, the preferred optionally substituted alkyl radicals being: methyl, ethyl, propyl, octyl and 3,3,3-trifluoropropyl, or a $C_2$–$C_8$ alkenyl radical, or an optionally substituted $C_5$–$C_8$ cycloalkyl radical, or an aryl or aralkyl radical which is optionally substituted:

in particular by halogens and/or alkoxys,
phenyl, xylyl, tolyl and dichlorophenyl radicals being very particularly selected,
and, more preferably still, at least 60 molar % of the $R^3$ radicals being methyls,
the Z symbols are alike or different and represent:
either the $R^3$ radical,
or a CFG group corresponding to an epoxide or vinyl ether residue connected to the silicon via a divalent radical advantageously comprising from 2 to 20 carbon atoms and optionally comprising a heteroatom, at least one of the Z symbols corresponding to a CFG group.

Mention may be made, as examples of CFG organofunctional groups of the epoxy type, of those of following formula:

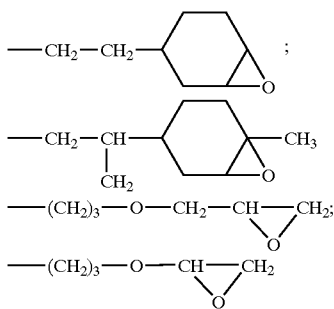

Mention may be made, as regards CFG organofunctional groups of the vinyl ether type, of, e.g., those present in the following formulae:

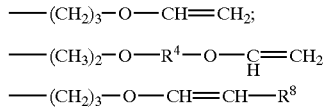

with $R^4$=
linear or branched $C_1$–$C_{12}$ alkylene which is optionally substituted,
or arylene, preferably phenylene, which is optionally substituted, preferably by one to three $C_1$–$C_6$ alkyl groups;
with $R^5$ linear or branched $C_1$–$C_6$ alkyl.

The preferred epoxyfunctional or vinyloxyfunctional polyorganosiloxanes are disclosed in particular in patents DE-A-4 009 889; EP-A-0 396 130; EP-A-0 355 381; EP-A-0 105 341; FR-A-2 110 115 and FR-A-2 526 800.

The epoxyfunctional polyorganosiloxanes can be prepared by a hydrosilylation reaction between oils possessing Si—H units and epoxyfunctional compounds, such as, for example, 4-vinylcyclohexene oxide or allyl glycidyl ether.

The vinyloxyfunctional polyorganosiloxanes can be prepared by a hydrosilylation reaction between oils possessing Si—H units and vinyloxyfunctional compounds, such as, for example, allyl vinyl ether or allylvinyloxyethoxybenzene.

More preferably still, the POSs A are epoxy-silicones of following formulae (A.1), (A.2) and (A.3):

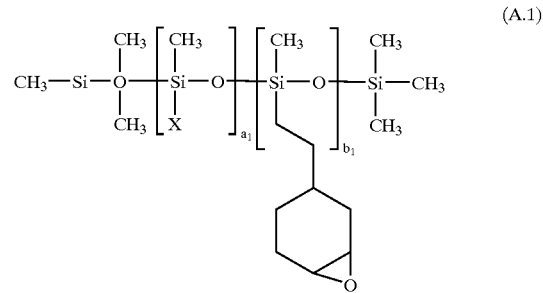

with X $CH_3$; phenyl; $C_5$–$C_8$ cycloalkyl; $C_1$–$C_{18}$ alkyl; $C_2$–$C_8$ alkenyl; —OH; H; —$CH_2$—$CH_2$—$CH_2$—OH; —$CH_2$—$CH_2$—$CF_3$ or —$(CH_2)_n$—$CF_3$, n=1 to 20;

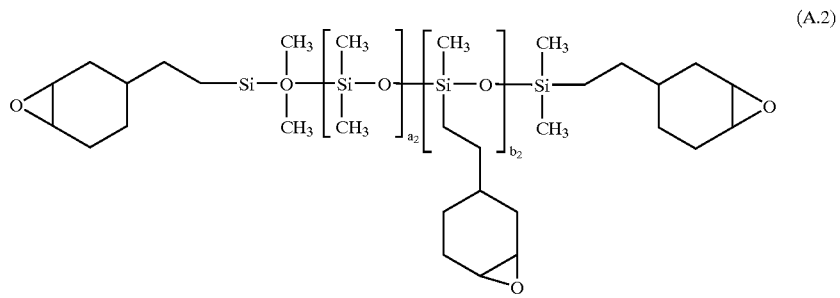

$a_1$, $a_2$, $b_1$ and $b_2$ being defined as follows in these formulae (A.1) and (A.2)

|  | $1 \leq a_1, a_2$ | $1 \leq b_1, b_2$ |
|---|---|---|
| preferably | $1 \leq a_1, a_2 \leq 5000$ | $1 \leq b_1, b_2 \leq 500$ |
| and more preferably still | $1 \leq a_1, a_2 \leq 1000$ | $1 \leq b_1, b_2 \leq 100$; |

$a_2$ and $b_2$ being 0 in the formula (A.2) to give the epoxidized disiloxane (A.3).

According to another advantageous characteristic of the invention, the POS(s) (A) has (have) a viscosity η (expressed in mPa·s at 25° C.) of between:
→ 100 and 10 000,
→ preferably 200 and 5 000,
→ and more preferably still between 300 and 3 000.

These viscosity values relate both to the linear POSs and the cyclic POSs which can be employed in accordance with the use according to the invention. The dynamic viscosity at 25° C. of all the silicone polymers considered in the present account can be measured using a Brookfield viscometer according to AFNOR standard NFT 76 102 of February 1972. The viscosity with which the present account is concerned is the dynamic viscosity at 25° C., known as the "Newtonian" viscosity, that is to say the dynamic viscosity which is measured, in a way known per se, at a sufficiently low shear rate gradient for the viscosity measured to be independent of the rate gradient.

In accordance with the invention, it is perfectly possible to envisage the use of a mixture of different POSs A possessing units of formula (I) and (II) as defined above (linear and/or cyclic).

According to a preferred characteristic of the invention, the initiators B are, e.g.: the onium borates disclosed in European patent application EP-A-0 562 922 or in application PCT/WO-A-98/29498 (the contents of which are fully incorporated in the present account by reference). More specifically still, use may in practice be made of the initiator of following formula:

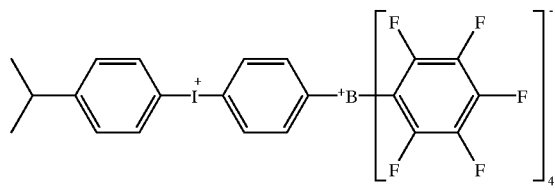

In practice, the initiators of the use according to the invention are prepared in a very simple way by dissolution of the onium borate or organometallic complex borate, preferably onium borate, which are provided in the solid (powder) form, in a solvent.

According to an alternative relating to the onium borate, the latter can be prepared directly in the solvent from a salt (e.g., chloride) of the cation (iodonium) and from a salt (for example, potassium) of the borate anion.

Without departing, however, from the scope of the present invention, it will be mentioned that the initiator (PI) can be employed in solution in an organic solvent, preferably chosen from proton-donating solvents and more preferably still from the following group: isopropyl alcohol, benzyl alcohol, diacetone alcohol, butyl lactate, esters and their mixtures. As is claimed in French patent No. 2 724 660, proton-donating organic solvents with an aromatic nature (benzyl alcohol) behave as crosslinking accelerators. It is therefore advantageous to use them to dissolve the photo-initiator.

It should be specified that the term "effective cationic amount of PI" is understood to mean, within the meaning of the invention, the amount sufficient to initiate the crosslinking.

Insofar as, as indicated above, the initiator is dissolved in a polar solvent, said solvent is used in an amount such that the content of initiator in the solution obtained is between 1 and 50% by weight, preferably between 10 and 30% by weight and more preferably still between 15 and 25% by weight.

The incorporation of the PI in solution in the composition comprising the POS possessing a given molar content of CFG is carried out in a proportion of 0.01 to 10% by weight of PI with respect to the POS(s) A, preferably 0.1 to 5% by weight and more preferably of the order of 0.2 to 2% by weight.

As regards the reactive diluent(s) C, it is (or they are) preferably chosen:

→ from the nonorganosilicon organic compounds ($C_1$) possessing CFG+optionally SFG reactive groups having the following formulae:

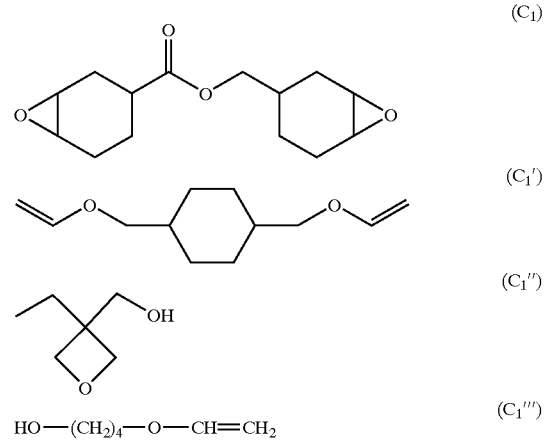

$HO-(CH_2)_4-O-CH=CH_2$      ($C_1'''$)

→ and/or from the organosilicon compounds ($C_2$) possessing CFG+optionally SFG reactive groups having the following formulae:

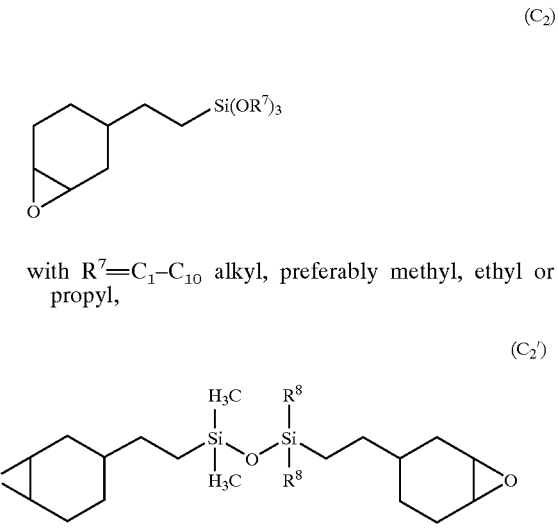

with $R^7=C_1-C_{10}$ alkyl, preferably methyl, ethyl or propyl, with $R^8$ independently representing a $C_1-C_{10}$ alkyl, preferably a methyl.

This reactive diluent C is composed of small crosslinkable molecules capable of reacting with one another and/or with the CFG groups of the POSs A via their CFG+optionally SFG functional groups. These reactive diluent compounds C thus form crosslinking networks which can be at least partly interpenetrating with the crosslinking networks formed after the reaction of the CFGs of the POSs A. The purpose of these reactive diluents C is to render fluid the uncrosslinked liquid composition employed in the process according to the invention. They are viscosity reducers which facilitate the handling of the liquid composition intended to be applied to the cylinder head gasket, in particular the MLS cylinder head gasket, before crosslinking, preferably under UV radiation, to form a film.

According to a preferred arrangement of the process according to the invention, the diluent C is chosen so that it exhibits a boiling point B.p.≧100° C., preferably 100° C.≦B.p.≦300° C., at standard atmospheric pressure and a viscosity at 25° C. η≦100 mPa.s, preferably 1≦η≦100 mPa.s.

As regards the pigment D, a black pigment and more preferably still carbon black is employed in accordance with the process according to the invention. The preferred carbon black is that exhibiting a small particle size, advantageously a mean particle size of less than 100 nanometers, and/or having a neutral or acidic nature, the pH advantageously being between 1 and 7.

Mention may be made, by way of examples, of the following commercial carbon blacks: Mogul L, Regal 400R or Regal 660R, sold by Cabot, and the products Special 250 or Printex 75, sold by Degussa.

It is preferable to employ carbon black at a level of between 0.1 and 5% by weight and more preferably of between 0.5 and 2% by weight, with respect to the POSs A.

The invention is not limited to the use of carbon black as pigment and it is conceivable to employ pigments with different color, such as, for example, titanium dioxide, phthalocyanine, benzymidadozolone, naphthols, diazopirazolones, or diarylide or monoarylide yellow pigments.

The optional fillers E are siliceous fillers, such as, for example, fumed silicas treated with hexamethyldisilasane or with octamethylcyclotetrasiloxane. The specific surface area of these fumed silicas thus treated conventionally varies within the range from 100 to 400 $m^2/g$. Precipitation silica is another example of the siliceous filler E which can be employed in the process according to the invention. Apart from the siliceous fillers, it is also possible to use fillers composed of: milled natural or synthetic (polymer) fibers; silicon carbide, silicon oxycarbide or silicon nitrocarbide powders or inorganic fibers; calcium carbonate; talc; clays; or titanium dioxide. The optional fillers are preferably siliceous fillers based on fumed silica and/or on precipitation silica.

As regards the optional photosensitizers F, they can be selected from (poly)aromatic products, which are optionally metallic, and heterocyclic products and preferably from the list of following products: phenothiazine, tetracene, perylene, anthracene, 9,10-diphenylanthracene, thioxanthone, benzophenone, acetophenone, xanthone, fluorenone, anthraquinone, 9,10-dimethylanthracene, 2-ethyl-9,10-dimethyloxyanthracene, 2,6-dimethylnaphthalene, 2,5-diphenyl-1,3,4-oxadiazole, xanthopinacol, 1,2-benzanthracene, 9-nitroanthracene and their mixtures.

More specifically, the photosensitizer can be a thioxanthone-based product:

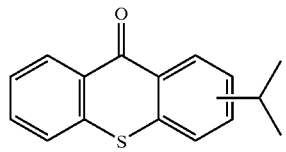

It is preferable, in accordance with the invention, to stabilize the formulation employed with an amine inhibitor T. The amine agent which can be used can be a linear secondary or tertiary amine or a sterically hindered cyclic amine of HALS type comprising, for example, in its structure, at least one piperidinyl residue substituted by an alkyl group on the nitrogen atom. Mention may be made, as examples of amine agents, of those disclosed in Patent Application PCT/WO-A-98/07798; furthermore, the content of this application is fully incorporated in the present account by reference. Hindered cyclic amines of HALS type are highly suitable.

The uncrosslinked liquid silicone composition employed in the process according to the invention can also comprise an adhesion promoter H preferably chosen from alkoxylated and/or epoxidized silanes and their mixtures.

Mention may be made, as examples of promoters H, of:
5,6-epoxy-3-ethylcyclohexyltriethoxysilane of formula:

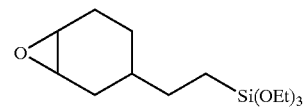

or alternatively 3-glycidoxypropyltrimethoxysilane (GLYMO):

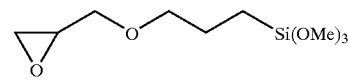

or alternatively vinyltrimethoxysilane (VTMO) of formula:

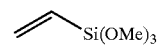

According to an advantageous alternative form of the process in accordance with the invention, prior to stage 1, the support to be coated is covered using an adhesion primer, preferably of the type of those comprising at least one compound chosen from the group consisting of:
  alkoxylated silanes carrying at least one ethylenic unsaturation and/or at least one epoxide functional group, preferably γ-glycidoxypropyltrimethoxysilane (GLYMO) and/or γ-methacryloxypropyltrimethoxysilane and/or vinyltrimethoxysilane (VTMO);
  (meth)acrylates, preferably poly(methyl methacrylate),
  metal chelates and/or alkoxides, preferably alkyl titanates and more preferably still butyl titanate or propyl titanate;
  crosslinkable silicone compositions and compositions which are precursors of silicone elastomers, preferably of polyaddition RTV silicone elastomer type.

In the context of an adhesion primer consisting in a composition of polyaddition RTV silicone elastomer type, use may be made of the compositions belonging to groups (i), (2i) and (3i) as defined below:
  (i) coating silicone elastomer composition of RTV type comprising: at least one POS I of SiVi type; at least one POS II of SiH type; a platinum hydrosilylation catalyst III; an adhesion promoter IV comprising at least one alkoxylated organosilane IV.1 comprising, per molecule, at least one vinyl group (vinyltrimethoxysilane), at least one organosilicon compound IV.2 comprising at least one epoxy radical (3-glycidoxypropyltrimethoxysilane GLYMO) and at least one metal M chelate IV.3 and/or one metal alkoxide (butyl titanate); optionally an inorganic filler; optionally at least one crosslinking inhibitor; optionally at least one polyorganosiloxane resin; and optionally hollow organic or inorganic microspheres. These silicone compositions are disclosed in patent applications FR-A-2 719 598, WO-A-98/05723 and WO-A-99/02592;
  (ii) polyaddition RTV silicone elastomer obtained from a composition comprising POSs I of SiVi type and POSs II of SiH type, and a particulate filler obtained by treatment using a compatibilizing agent introduced into the preparation medium:

first, before and/or substantially simultaneously with the operation in which a portion of the silicone oil employed is brought into contact with a portion of the particulate filler, this introduction of compatibilizing agent being carried out one or more times for a fraction of compatibilizing agent represents at most 8% by dry weight of the total particulate filler;

and, secondly, after this operation in which POS and filler are brought together. The compatibilizing agent is hexamethyldisilansane HMDZ. The SiVi oil is an α,ω-dihydro polydimethylsiloxane and a polyhydro PDMS oil. This RTV elastomer composition (ii), crosslinkable by polyaddition and comprising a particulate filler specifically compatibilized with HMDZ, is described in detail in patent application WO-A-98/58997;

(3i) RTV silicone elastomer coating crosslinked by polyaddition and obtained from a composition comprising:
  (1) at least one polyorganosiloxane exhibiting per molecule, at least two $C_2$–$C_6$ alkenyl groups bonded to silicon (e.g. α,ω-vinylated PolyDimethylSiloxane (PDMS);
  (2) at least one polyorganosiloxane exhibiting, per molecule, at least two hydrogen atoms bonded to silicon (e.g. α,ω-dihydro PDMS and polyhydro PDMS),
  (3) a catalytically effective amount of at least one catalyst composed of at least one metal belonging to the platinum group,
  (4) a ternary adhesion promoter comprising:
    (4.1) at least one alkoxylated organosilane comprising, per molecule, at least one $C_3$–$C_6$ alkenyl group (e.g.: γ-methacryloxy-propylated trimethoxysilane)
    (4.2) at least one organosilicon compound comprising at least one epoxy radical (e.g.: γ-glycidoxypropyltrimethoxysilane)
    (4.3) at least one metal M chelate and/or one metal alkoxide of general formula: $M(OJ)_n$, with n=valency of M and J=linear or branched $C_1$–$C_8$ alkyl,
    M being chosen from the group formed by: Ti, Zr, Ge, Li, Mn, Fe, Al and Mg (e.g.: butyl titanate).
  (5) a reinforcing siliceous filler treated in situ with a compatibilizing agent (e.g.: HMDZ) in the presence of polyorganosiloxane (I),
  (6) a polyorganosiloxane described as extender and exhibiting end siloxyl units possessing hydro functional groups,
  (7) optionally a neutralizing agent,
  (8) optionally a crosslinking inhibitor and/or other additive(s) used in compositions of this type (e.g.: ethynylcyclohexanol),
  (9) and optionally expanded or expandable hollow inorganic microsphere fillers.

The compositions according to (3i) are described in the French patent application filed on 23 Dec. 1998 under the national registration No. 98/16510.

The application of a layer of primers to the support composed of the sheet gasket, in particular of the cylinder head gasket, makes it possible to improve the adhesion of the silicone coating selected in accordance with the invention.

As regards the primer compositions comprising alkoxylated silanes, such as GLYMO or VTMO, it is possible, when it is desired to apply layers with a thickness approaching that of the molecular scale, that is to say a thickness of less than 1 μm, to use them for the application in the form of a solution in an organic solvent, preferably an alcohol, an ether or a ketone, the latter being particularly preferred. Mention may be made of methyl ethyl ketone (MEK) as an example of a ketone suitable as primer solvent. The concentrations of alkoxylated silane in the primer compositions in the solution form are between 0.1 and 10, preferably between 0.1 and 5 and more preferably still between 0.5 and 2%.

It is possible to have recourse to other additives known in this type of application of silicone compositions crosslinkable by the cationic route. In this connection, mention may be made, without implied limitation, of:

adhesion modifiers (linear silicone resin or polymer carrying, for example, vinyl, epoxy, vinyl ether or alcohol functional groups), e.g. those disclosed in European patent application No. 0 738 769;

one or more polymerization and/or crosslinking accelerators preferably chosen from hydroxylated carboxylic acid esters which are liquid at ambient temperature.

In practice, the application of the uncrosslinked silicone composition to the sheet gasket support, in particular cylinder head gasket support, is carried out by any appropriate known means, such as, for example, doctor blade or coating roll techniques.

The degree of deposition is advantageously between 2.5 and 250 g/m² of surface area to be coated and preferably between 5 and 100 g/m².

According to a preferred form, the crosslinking of the composition applied to the support is carried out by supplying energy which is provided by UV radiation, taken alone or in combination with infrared (IR) radiation.

This UV radiation exhibits a wavelength of, for example, between 200 and 400 nanometers, preferably between 254 and 360 nanometers. The IR radiation exhibits a wavelength of, for example, between 1 and 10 μm, preferably between 1 and 4 μm. The duration of the irradiations can be short and it is generally less than 1 s. For very thin coatings, it is even of the order of a few hundredths of a second.

In accordance with the invention, it is observed that the crosslinking achieved is excellent, even in the absence of any heating.

In addition, it is obvious that the curing time can be adjusted, in particular by the number of UV+optionally IR lamps used, by the duration of exposure to UV+optionally IR radiation and by the distance between the composition and the UV+optionally IR lamp(s).

As regards the metal cylinder head gasket supports of MLS multilayer gasket type, the degrees of deposition are between 10 and 50 g/m².

The process according to the invention is advantageous in that it requires little or no organic solvent. The result of this is pollution and a significant saving. In addition, the crosslinking is fast, which makes it possible to obtain high production rates. Furthermore, the method of activation of the crosslinking is not gradual for most of the support and does not require a high energy consumption. Finally, and in particular, the simplicity of the process with regard to the methodology and the equipment significantly limits the cost of the industrial capital expenditures necessary for manufacturers of cylinder head gaskets.

It will also be indicated that the process according to the invention makes possible the selection of an appropriate liquid precursor silicone composition and makes it possible to obtain coatings for the engine block/cylinder head interface which are releasable, which are perfectly of the preferably metal support formed by the cylinder head gasket, which are leaktight and which have mechanical properties of hardness and of excellent resistance to scratching, which withstand solvents and engine fluids and, finally, which are stable to temperature.

The examples which follow will make possible a better understanding of the process according to the invention and illustrate all the advantages and the alternative embodiments of said process.

EXAMPLES

Products Employed

Photocrosslinkable varnish formulations are prepared from the following polymers and compounds:

A) Polyorganosiloxanes:

Use is made of polymers of formula:

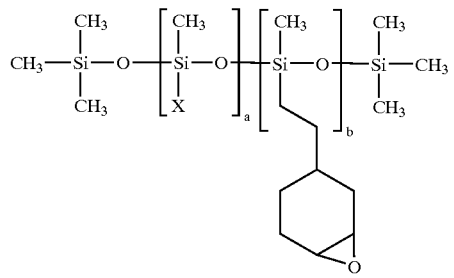

$A_1$): x=$CH_3$; a=70; b=7
$A_2$): x=$CH_3$; a=444; b=35

B) Initiator:

Use is made of a compound of formula:

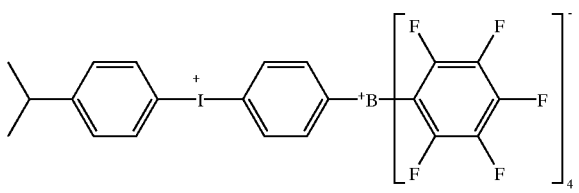

This initiator B is in the form of an 18% by weight solution in isopropyl alcohol.

C) Reactive Diluent:

Use is made of a compound of formula:

D) Pigment:

Use is made of a black pigment of the carbon black type, sold by Degussa under the name Special 250.

E) Inorganic Filler:

Use is made of a fumed silica treated with octamethylcyclotetrasiloxane (silica having a specific surface area of 300 $m^2$/g).

F) Photosensitizer:

Use is made of isopropylthioxanthone of formula:

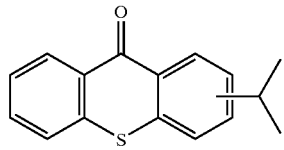

G) Stabilizer:

Use is made of the amine compound of formula:

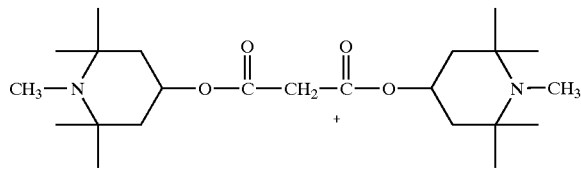

The preparation of a formulation which can be used directly in the preparation of multilayer cylinder head gaskets is described in the examples which follow.

Preparation

1—The carbon black D is incorporated with stirring in the epoxidized silicone oil A1 until a homogeneous dispersion is obtained (30 min).

2—This dispersion is subsequently passed through a mill.

3—The silica E is gradually incorporated in the epoxidized silicone oil A2 with stirring.

4—1,4-Cyclohexanedimethanol divinyl ether, =reactive diluent C, is charged, still with stirring.

5—Finally, the pigmentary base prepared in stages 1 and 2 is charged with stirring, followed by the initiator B and the photosensitizer F, and the mixture is stirred vigorously for an additional 15 minutes.

6—The liquid composition is stored in a container with the exclusion of light.

The stabilizer G is incorporated beforehand in the epoxidized silicone oil A1.

Example 1

An MLS plate of steel or stainless steel type is coated.

An amount of 15 g/$m^2$ of the following composition:

$A_1$—30 parts by weight,
$A_2$—36 parts by weight,
B—3 parts by weight,
C—20 parts by weight,
D—1 part by weight,
E—10 parts by weight,
F—0.0198 part by weight,
G—0.004 part by weight, was spread in one passage using the Meyer bar technique.

The metal supports (steel or stainless steel) are given a primer beforehand with a 1% by weight solution of glycidylpropyltrimethoxysilane (GLYMO) in methyl ethyl ketone and are heated at 200° C. for 30 minutes. The coated face is irradiated at a rate of 10 m/min using a gallium-doped mercury UV lamp with a power of 120 W/cm. The coating, with a black coloring, adheres to the support, is resistant to temperature, to engine oils and to the cooling fluid (manufacturers' requirements), and exhibits good resistance to solvents and to the scratch test.

Example 2

An MLS plate of steel or stainless steel type is coated.

30 g/m² of the same formula as for Example 1 are applied in the same way as for Example 1.

The combined properties measured are collated in the following table:

| Characteristics | | Example 1 | Example 2 |
|---|---|---|---|
| Thickness | | 15 μm | 30 μm |
| Color | | Black | Black |
| Crosslinking conditions | | UV crosslinking | UV crosslinking |
| Max. rate | | 10 m/min | 10 m/min |
| MEK (methyl ethy ketone) solvent resistance | (1) | >200 | >200 |
| Shore A hardness | (2) | 70 | 70 |
| Adhesion to metal | | Primer | Primer |
| Releasability properties | (3) | 0.195 | 0.205 |
| Scratch test | (4) | 60 g | 120 g |
| Crosshatch test | (5) | | |
| Temperature resistance (70 h/200° C.) | | Crosshatch 0–1 | Crosshatch 0–1 |
| Resistance to oils (70 h/150° C.) | | Crosshatch 1 | Crosshatch 1 |
| Resistance to the cooling fluid (70/100° C.) | | Crosshatch 4 | Crosshatch 4 |

(1) Resistance to MEK: the measurement is made of the resistance to the solvent of the coating obtained prepared drying 12 μm films over a manual coating rod with the reference No. 2 from Erichsen, the number of to-and-fro movements, carried out using a rag impregnated with solvent, necessary to disintegrate the coating layer after drying for 24 hours being recorded.

(2) The Shore A hardness is measured according to the instructions of DIN standard 53505.

(3) The releasability test is carried out according to the instructions of ASTM standard F 607-84. In this test, the measurement is made (in particular) of the tensile strength, in MPa, at the time of the detachment of two coated surfaces after compression. 72 h at 120° C.

(4) The scratch test consists in measuring the ability of the coating to be scratched by a diamond tip loaded with weights of increasing size. This test is carried out according to the instructions of AFNOR standard NFT 51-113 (August 1976).

(5) The crosshatch test consists in scratching the coating by producing a criss-cross pattern with a comb and in then observing the surface condition after sticking and unsticking an adhesive tape on the support; if no flaking has taken place, the surface condition is given the index "0"; if the flaking represents more than 65% of the surface area of the criss-cross pattern, the condition of the surface is given the index "5". This test is carried out after temperature conditioning the samples in hot oil and in cooling fluid. This test is carried out according to the instructions of AFNOR standard NFT 30-038. The adhesive tape used is an adhesive tape of PSA silicone type.

What is claimed is:

1. A process for carrying out impregnation and/or for preparing a coating which gives release and is leaktight employed at the engine block/cylinder head interface of engines and applied to sheet gaskets, comprising:

1 employing a silicone composition comprising:

A 100 parts by weight of at least one polyorganosiloxane (POS) crosslinkable by the cationic and/or radical route and via crosslinking functional groups (CFGs), these CFGs being identical to or different from one another and being selected from the group consisting of at least one functional unit of heterocyclic nature having one or more electron-donating atoms, at least one ethylenically unsaturated functional unit that is substituted by at least one electron-donating atom which enhances the basicity of the π system, and mixtures thereof;

B from 0.01 to 10 parts by weight of at least one initiator salt (PI) which is a borate of an onium of an element from groups 15 to 17 of the Periodic Classification or of an organometallic complex of an element from groups 4 to 10 of the Periodic Classification, a cationic entity of said borate being selected from the group consisting of:

(1) onium cations of formula (I):

in which formula:

A represents an element from groups 15 to 17;

$R^1$ represents a $C_6$–$C_{20}$ carbocyclic or heterocyclic aryl radical;

$R^2$ represents $R^1$ or a linear or branched $C_1$–$C_{30}$ alkyl or alkenyl radical; said $R^1$ and $R^2$ radicals optionally being substituted by a $C_1$–$C_{25}$ alkoxy, $C_1$–$C_{25}$ alkyl, nitro, chloro, bromo, cyano, carboxy, ester or mercapto group, n is an integer ranging from 1 to v+1, v being the valency of the element A, m is an integer ranging from 0 to v−1, with n+m=v+1

(2) the oxoisothiochromanium cations having the formula:

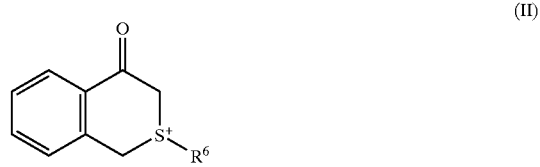

where the $R^6$ radical represents a linear or branched $C_1$–$C_{20}$ alkyl radical;

(3) sulfonium cations where the cationic entity comprises at least one of:

3.1. a polysulfonium species of formula III.1

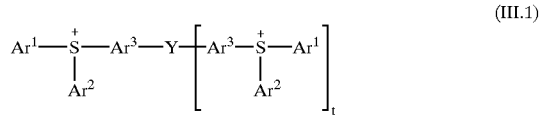

in which:

the $Ar^1$ symbols, which can be identical to or different from one another, each represent a monovalent phenyl or naphthyl radical optionally substituted with one or more radicals selected from the group consisting of: a linear or branched $C_1$–$C_{12}$ alkyl radical, a linear or branched $C_1$–$C_{12}$ alkoxy radical, a halogen atom, an —OH group, a —COOH group, a —COO-alkyl ester group, where the alkyl part is a linear or branched $C_1$–$C_{12}$ residue, and a group of formula —$Y^4Ar^2$, where the $Y^4$ and $Ar^2$ symbols have the meanings given immediately below, the $Ar^2$ symbols, which can be identical to or different from one another or $Ar^1$ each represent a monovalent phenyl or naphthyl radical optionally substituted with one or more radicals selected from the group consisting of: a linear or branched $C_1$–$C_{12}$ alkyl radical, a linear or branched $C_1$–$C_{12}$ alkoxy radical, a halogen atom, an —OH group, a —COOH group and a —COO-alkyl ester group, where the alkyl part is a linear or branched $C_1$–$C_{12}$ residue, the $Ar^3$ symbols, which can be identical to or different from one another, each represent a divalent phenylene or naphthylene radical optionally substituted with one or more radicals chosen from: a linear or branched $C_1$–$C_{12}$ alkyl radical, a linear or branched $C_1$–$C_{12}$ alkoxy radical, a halogen atom, an —OH group, a —COOH group or a —COO-alkyl ester group, where the alkyl part is a linear or branched $C_1$–$C_{12}$ residue, t is an integer equal to 0 or 1, with the proviso that:

when t=0, the Y symbol is then a $Y^1$ monovalent radical representing the group of formula $Y^1$:

$$-\overset{+}{S}-Ar^1$$
$$\underset{Ar^2}{|}$$

where the $Ar^1$ and $Ar^2$ symbols have the meanings given above, when t=1:

on the one hand, the Y symbol is then a divalent radical having the following meanings $Y^2$ to $Y^4$:

$Y^2$: a group of formula:

$$-\overset{+}{S}-Ar^1$$
$$\underset{Ar^2}{|}$$

where the $Ar^2$ symbol has the meanings given above, $Y^3$: a single valency bond, $Y^4$: a divalent residue selected from the group consisting of:

$$-O-,\quad -S-,\quad -\underset{\underset{O}{\|}}{S}-,\quad -\underset{\underset{O}{\|}}{C}-,$$

a linear or branched $C_1$–$C_{12}$ alkylene residue and a residue of formula —Si(CH$_3$)$_2$O—, on the other hand, solely in the case where the Y symbol represents $Y^3$ or $Y^4$, the $Ar^1$ and $Ar^2$ (terminal) radicals have, in addition to the meanings given above, are optionally connected to one another via the Y', residue comprising $Y'^1$, a single valency bond, or in $Y'^2$, a divalent residue selected from the group of residues recited in the definition of $Y^4$, which is inserted between the carbon atoms, facing each other, situated on each aromatic ring in the ortho position with respect to the carbon atom directly bonded to the $S^+$ cation; and 3.2. a monosulfonium species having a single $S^+$ cationic center per mole of cation and comprising, in the majority of cases, in species of formula:

$$Ar^1-\overset{+}{S}-Ar^1 \quad (III.2)$$
$$\underset{Ar^2}{|}$$

in which $Ar^1$ and $Ar^2$ have the meanings given above with respect to the formula (III.1), including the possibility of connecting directly between them only one of the $Ar^1$ radicals to $A^2$ according to the way indicated above with respect to the definition of the additional condition in force when t=1 in the formula (II) involving the Y' residue;

(4) organometallic salts cations of formula (IV):

$$(L^1L^2L^3M)^{q+} \quad (IV)$$

in which formula:

M represents a metal from group 4 to 10, $L^1$ represents 1 ligand bonded to the metal M via π electrons, which ligand is selected from the group consisting of $\eta^3$-alkyl, $\eta^5$-cyclopendadienyl, $\eta^7$-cyclo-heptratrienyl ligands and $\eta^6$-aromatic compounds selected from the group consisting of optionally substituted $\eta^6$-benzene ligands and compounds having from 2 to 4 condensed rings, each ring being capable of contributing to the valency layer of the metal M via 3 to 8 π electrons, $L^2$ represents a ligand bonded to the metal M via π electrons, which ligand is selected from the group consisting of $\eta^7$-cycloheptatrienyl ligands and $\eta^6$-aromatic compounds selected from the group consisting of optionally substitute $\eta^6$-benzene ligands and compounds having from 2 to 4 condensed rings, each ring being capable of contributing to the valency layer of the metal M via 6 or 7 π electrons, $L^3$ represents from 0 to 3 identical or different ligands bonded to the metal M via σ electrons, which ligand(s) is (are) CO or NO$_2^+$; the total electronic charge q of the complex to which $L^1$, $L^2$ and $L^3$ and the ionic charge of the metal M contribute being positive and equal to 1 or 2;

an anionic entity borate having the formula:

$$[BX_aR_b]^-$$

in which formula:

a and b are integers ranging from 0 to 3 for a and from 1 to 4 for b, with a+b=4, the X symbols represent:

a halogen atom with a=0 to 3, an OH functional group with a=0 to 2, the R symbols are identical or different and represent:

a phenyl radical substituted by at least one electron-withdrawing group and/or by at least 2 halogen atoms, this being when the cationic entity is an onium of an element from groups 15 to 17, a phenyl radical substituted by at least one electron-withdrawing element or group, this being when the cationic entity is an organometallic complex of an element from groups 4 to 10, an aryl radical comprising at least two aromatic nuclei, which is optionally substituted by at least one electron-withdrawing element or group, whatever the cationic entity;

C 1 to 50 parts by weight of at least one reactive diluent selected from the group consisting of a nonorganosilicon organic compound, and an organosilicon comprising, in its structure, at least one CFG as defined above and at least one secondary functional group (SFG) other than a CFG but capable of reacting chemically with a CFG;

D 0 to 10 parts by weight of at least one pigment;

E 0 to 100 parts by weight of a filler of inorganic nature;

F 0 to 10 parts by weight of at least one photosensitizer;

G 0 to $10^{-2}$ part by weight of a stabilizer comprising at least one stabilizing amine agent, H 0 to 5 parts by weight of an adhesion promoter;

2 applying this composition to a support, and 3 crosslinking the applied composition by photochemical and/or thermal activation and/or under an electron beam.

2. The process as claimed in claim 1, wherein the support is a metal cylinder head gasket.

3. The process as claimed in claim 2, wherein the support is a metal multilayer cylinder head gasket and a coating is formed on at least one of the faces of at least one of the layers comprising the metal multilayer cylinder head gasket.

4. The process as claimed in claim 1, wherein the functional units included in the CFG groups are selected from the group consisting of the following units:

an ethylenically unsaturated and activated functional group, epoxide, oxetane, and their mixtures, and wherein the functional units included in the optional SFG groups are selected from the group consisting of the following units:

hydroxyl, alkoxy, carboxyl, and their mixtures.

5. The process as claimed in claim 1, wherein the polyorganosiloxane is an epoxysilicone and/or a vinyl ether silicone which is:

either linear or substantially linear and comprised of units of formula (I), terminated by units of formula (II), or cyclic and comprised of units of formula (II):

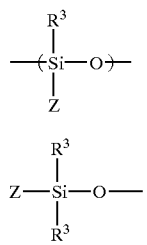

in which formulae:

the $R^3$ symbols are alike or different and represent:
either a hydroxyl radical,
or a linear or branched $C_1$–$C_{18}$ alkyl radical which is optionally substituted by one or more halogens and/or a hydroxyl radical, or a $C_2$–$C_8$ alkenyl radical,
or an optionally substituted $C_5$–$C_8$ cycloalkyl radical,
or an aryl or aralkyl radical which is optionally substituted by halogens and/or alkoxyls, the Z symbols are alike or different and represent:
either the $R^3$ radical,
or a CFG group corresponding to an epoxide or vinyl ether residue connected to the silicon via a divalent radical comprising from 2 to 20 carbon atoms and optionally comprising a heteroatom, at least one of the Z symbols corresponding to a CFG group.

6. The process as claimed in claim 1, wherein the polyorganosiloxane is an epoxysilicone having a formula selected from th e group consisting of (A.1), (A.2) and (A.3):

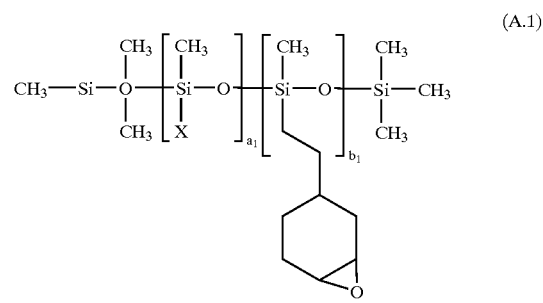

wherein X=$CH_3$; phenyl; $C_5$–$C_8$ cycloalkyl; $C_1$–$C_{18}$ alkyl; $C_2$–$C_8$ alkenyl; —OH; H; —$CH_2$—$CH_2$—$CH_2$—OH; —$CH_2$—$CH_2$—$CF_3$ or —$(CH_2)_n$—$CF_3$, n=1 to 20;

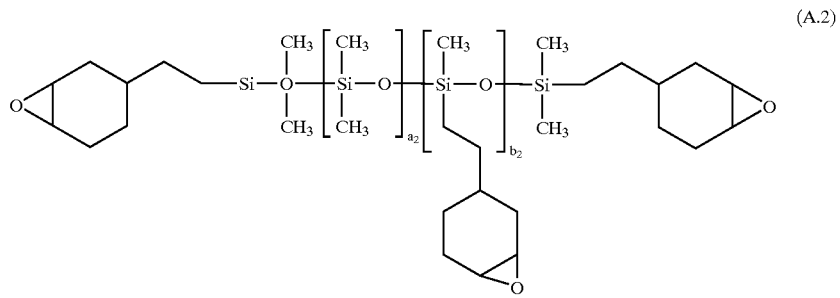

$a_1$, $a_2$, $b_1$ and $b_2$ being defined as follows in these formulae (A.1) and (A.2)

$$1 \leq a_1, a_2 \; 1 \leq b_1, b_2$$

$a_2$ and $b_2$ being=0 in the formula (A.2) to give the epoxidized disiloxane (A.3).

7. The process as claimed in claim 1, wherein the diluent (C) exhibits a boiling point B.P.$\geq$100° C. at standard atmospheric pressure and a viscosity at 25° C. $\eta \leq$100 mPa.s.

8. The process as claimed in claim 1, wherein, prior to stage 1, the support to be coated is covered using an adhesion primer comprising at least one compound selected from the group consisting of:
   alkoxylated silanes carrying at least one ethylenic unsaturation and/or at least one epoxide functional group,
   (meth)acrylates,
   metal chelates and/or alkoxides,
   crosslinkable silicone compositions, and compositions which are precursors of silicone elastomers.

9. The process as claimed in claim 1, wherein the heterocyclic aryl radical in formula (I) comprises nitrogen or sulfur as a heteroelement.

10. The process as claimed in claim 1, wherein the support is a cylinder head sheet gasket or a cylinder head/engine block interface.

11. A process for carrying out impregnation and/or for preparing a coating which gives release and is leaktight employed at the engine block/cylinder head interface of engines and applied to sheet gaskets, comprising:
   1 employing a silicone composition
   comprising:
   A 100 parts by weight of at least one polyorganosiloxane (POS) crosslinkable by the cationic and/or radical route and via crosslinking functional groups (CFGs), these CFGs being identical to or different from one another and being selected from the group consisting of at least one functional unit of heterocyclic nature having one or more electron-donating atoms, at least one ethylenically unsaturated functional unit that is substituted by at least one electron-donating atom which enhances the basicity of the $\pi$ system, and mixtures thereof;
   B from 0.01 to 10 parts by weight of at least one initiator salt (PI) which is a borate of an onium of an element from groups 15 to 17 of the Periodic Classification or of an organometallic complex of an element from groups 4 to 10 of the Periodic Classification,
   a cationic entity of said borate being selected from the group consisting of:
   (1) onium cations of formula (I):

$$((R^1)_n\text{—}A\text{—}(R^2)_m)^+ \quad (I)$$

in which formula:
   A represents an element from groups 15 to 17;
   $R^1$ represents a $C_6$–$C_{20}$ carbocyclic or heterocyclic aryl radical;
   $R^2$ represents $R^1$ or a linear or branched $C_1$–$C_{30}$ alkyl or alkenyl radical; said $R^1$ and $R^2$ radicals optionally being substituted by a $C_1$–$C_{25}$ alkoxy, $C_1$–$C_{25}$ alkyl, nitro, chloro, bromo, cyano, carboxy, ester or mercapto group,
   n is an integer ranging from 1 to v+1, v being the valency of the element A,
   m is an integer ranging from 0 to v–1, with n+m=v+1
   (2) the oxoisothiochromanium cations having the formula:

(II)

where the $R^6$ radical represents a linear or branched $C_1$–$C_{20}$ alkyl radical;
(3) sulfonium cations where the cationic entity comprises at least one of:
3.1. a polysulfonium species of formula III.1

(III.1)

in which:
the $Ar^1$ symbols, which can be identical to or different from one another, each represent a monovalent phenyl or naphthyl radical optionally substituted with one or more radicals selected from the group consisting of: a linear or branched $C_1$–$C_{12}$ alkyl radical, a linear or branched $C_1$–$C_{12}$ alkoxy radical, a halogen atom, an —OH group, a —COOH group, a —COO-alkyl ester group, where the alkyl part is a linear or branched $C_1$–$C_{12}$ residue, and a group of formula —$Y^4Ar^2$, where the $Y^4$ and $Ar^2$ symbols have the meanings given immediately below,
the $Ar^2$ symbols, which can be identical to or different from one another or $Ar^1$ each represent a monovalent phenyl or naphthyl radical optionally substituted with one or more radicals selected from the group consisting of: a linear or branched $C_1$–$C_{12}$ alkyl radical, a linear or branched $C_1$–$C_{12}$ alkoxy radical, a halogen atom, an —OH group, a —COOH group and a —COO-alkyl ester group, where the alkyl part is a linear or branched $C_1$–$C_{12}$ residue,
the $Ar^3$ symbols, which can be identical to or different from one another, each represent a divalent phenylene or naphthylene radical optionally substituted with one or more radicals chosen from: a linear or branched $C_1$–$C_{12}$ alkyl radical, a linear or branched $C_1$–$C_{12}$ alkoxy radical, a halogen atom, an —OH group, a —COOH group or a —COO-alkyl ester group, where the alkyl part is a linear or branched $C_1$–$C_{12}$ residue,
t is an integer equal to 0 or 1,
with the proviso that:
when t=0, the Y symbol is then a $Y^1$ monovalent radical representing the group of formula $Y^1$:

where the $Ar^1$ and $Ar^2$ symbols have the meanings given above,
when t=1:

on the one hand, the Y symbol is then a divalent radical having the following meanings $Y^2$ to $Y^4$:

$Y^2$: a group of formula:

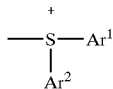

where the $Ar^2$ symbol has the meanings given above, $Y^3$: a single valency bond, $Y^4$: a divalent residue selected from the group consisting of:

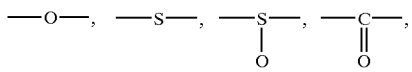

a linear or branched $C_1$–$C_{12}$ alkylene residue and a residue of formula —Si(CH$_3$)$_2$O—, on the other hand, solely in the case where the Y symbol represents $Y^3$ or $Y^4$, the $Ar^1$ and $Ar^2$ (terminal) radicals have, in addition to the meanings given above, are optionally connected to one another via the Y', residue comprising $Y'^1$, a single valency bond, or in $Y'^2$, a divalent residue selected from the group of residues recited in the definition of $Y^4$, which is inserted between the carbon atoms, facing each other, situated on each aromatic ring in the ortho position with respect to the carbon atom directly bonded to the $S^+$ cation; and 3.2. a monosulfonium species having a single $S^+$ cationic center per mole of cation and comprising, in the majority of cases, in species of formula:

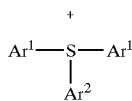

(III.2)

in which $Ar^1$ and $Ar^2$ have the meanings given above with respect to the formula (III.1), including the possibility of connecting directly between them only one of the $Ar^1$ radicals to $Ar^2$ according to the way indicated above with respect to the definition of the additional condition in force when t=1 in the formula (II) involving the Y' residue;

(4) organometallic cations of formula (IV):

$(L^1L^2L^3M)^{q+}$ <span style="float:right">(IV)</span> in which formula:

M represents a metal from group 4 to 10, $L^1$ represents 1 ligand bonded to the metal M via $\pi$ electrons, which ligand is selected from the group consisting of $\eta^3$-alkyl, $\eta^5$-cyclopendadienyl, $\eta^7$-cyclo-heptratrienyl ligands and $\eta^6$-aromatic compounds selected from the group consisting of optionally substituted $\eta^6$-benzene ligands and compounds having from 2 to 4 condensed rings, each ring being capable of contributing to the valency layer of the metal M via 3 to 8 $\pi$ electrons, $L^2$ represents a ligand bonded to the metal M via $\pi$ electrons, which ligand is selected from the group consisting of $\eta^7$-cycloheptatrienyl ligands and $\eta^6$-aromatic compounds selected from the group consisting of optionally substitute $\eta^6$-benzene ligands and compounds having from 2 to 4 condensed rings, each ring being capable of contributing to the valency layer of the metal M via 6 or 7 $\pi$ electrons, $L^3$ represents from 0 to 3 identical or different ligands bonded to the metal M via $\sigma$ electrons, which ligand (s) is (are) CO or $NO_2^+$; the total electronic charge q of the complex to which $L^1$, $L^2$ and $L^3$ and the ionic charge of the metal M contribute being positive and equal to 1 or 2;

an anionic entity borate having the formula:

$[BX_aR_b]$ in which formula:

a and b are integers ranging from 0 to 3 for a and from 1 to 4 for b, with a+b=4, the X symbols represent:

a halogen atom with a=0 to 3, an OH functional group with a=0 to 2, the R symbols are identical or different and represent:

a phenyl radical substituted by at least one electron-withdrawing group and/or by at least 2 halogen atoms, this being when the cationic entity is an onium of an element from groups 15 to 17, a phenyl radical substituted by at least one electron-withdrawing element or group, this being when the cationic entity is an organometallic complex of an element from groups 4 to 10, an aryl radical comprising at least two aromatic nuclei, which is optionally substituted by at least one electron-withdrawing element or group, whatever the cationic entity;

C 1 to 50 parts by weight of at least one reactive diluent selected from the group consisting of

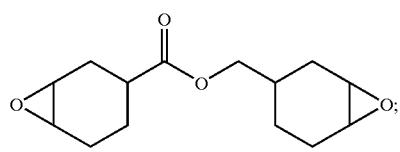 (C$_1$)

 (C$_1'$)

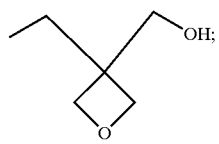 (C$_1''$)

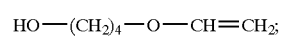 (C$_1'''$)

(C₂)
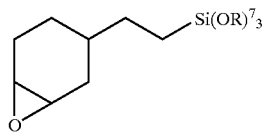
with R⁷=C₁–C₁₀ alkyl; and
(C₂')
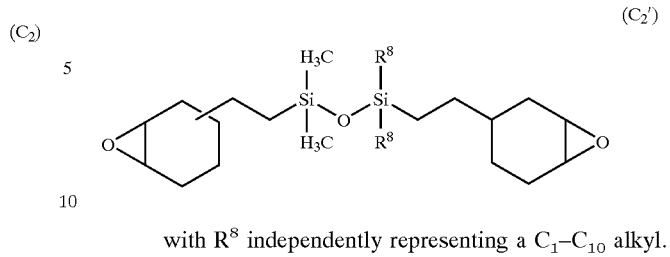
with R⁸ independently representing a C₁–C₁₀ alkyl.
* * * * *